United States Patent Office 3,389,185
Patented June 18, 1968

3,389,185
PROCESS FOR THE PARTIAL CHLORINATION
OF MONO- AND DIVALENT ALKYNOLS
Georg Bohm, Marl, Germany, assignor to Chemische
Werke Huls Aktiengesellschaft, Marl, Germany, a
corporation of Germany
No Drawing. Filed Apr. 23, 1964, Ser. No. 362,179
Claims priority, application Germany, Aug. 3, 1963,
C 30,620
5 Claims. (Cl. 260—633)

It is known to chlorinate butyne-(2)-diol-(1,4) with moderate yields either to the corresponding tetrachloro compound (German Patent No. 1,034,166) or in the presence of water or aqueous hydrochloric acid to a difficulty separable mixture of tetrachlorobutane diol and secondary products formed by the oxidizing action of the chlorine in aqueous solution (German Patent No. 1,119,850). The corresponding unsaturated dichloro compounds cannot, up to the present, be obtained in a technically satisfactory manner. It is also not possible to convert long chain alkynols into the corresponding unsaturated dichloroalkenols.

It has now been found that by partial chlorination of mono- and divalent alkynols good yields of the corresponding dichloroalkenols can be obtained if the mono- or divalent alkynol is reacted with less than 2 moles of gaseous chlorine per mole of the alkynol in the presence of dissolved hydrogen chloride at temperatures below 20° C.

Suitable alkynols for use in the process are, e.g., propargyl alcohol, butyne-(2)-diol-(1,4), butyne-(2)-ol-(1), hexyne-(3)-diol-(2,5) and 2,7-dimethyl-octyne-(4)-diol-(3,6).

The process preferably is carried out with relatively water-free starting materials, i.e., the alkynol, hydrogen chloride and chlorine but less than 1% of water generally does no harm. Preferably, however, starting materials that are as low in water content as possible are used.

The reaction can be carried out in the presence of diluents which dissolve the starting materials and the chlorination products and do not take part in the reaction such as, e.g., tetrahydrofuran and dioxan. When using alkynols that are solid at the reaction temperature employed the use of a solvent is unavoidable.

The amount of hydrogen chloride introduced as inhibitor depends upon the ability thereof to hinder side reactions. Since the inhibitive action of the hydrogen chloride generally increases with increasing amounts dissolved it is expedient to saturate the alkynol or its solution with hydrogen chloride. The solubility increases generally, as is known, with falling temperature and/or with increasing pressure. In some instances therefore the use of superatmospheric pressure, e.g., from 0.1 to 5 atmospheres is advantageous. The weight of the hydrogen chloride may be a multiple of the weight of the alkynol.

The amount of chlorine must be less than 2 moles per mole of the alkynol. Preferably from 1.0 to 1.3 moles of chlorine per mole of the alkynol is used.

The temperature during the hydrogen chloride and/or the chlorine treatment preferably is maintained so low that, as is to be seen from the withdrawal of heat that the added chlorine is still noticably reacted. Temperatures below —10° C. and preferably below —30° C. have been found to be most suitable.

The chlorine addition may take place with or without daylight as well as in the presence or absence of other actinic radiation. Catalysts such as metal chlorides or peroxides may be used. In the preferred embodiment light is excluded and catalyst is not used. At the end of the reaction it is advantageous to separate the hydrogen chloride and any unreacted dissolved chlorine under careful conditions, e.g., in a vacuum at a temperature of about 0° C. in order to avoid side reactions. The recovered hydrogen chloride and chlorine can be reused thus improving the economy of the process.

The product is worked up by known methods such as fractional distillation under reduced pressure. The chlorination and the working up of the product can both be carried out in continuous operation.

The dichloroalkenols are recovered as mixtures of the cis- and trans- compounds. Separation thereof as by fractionation or recrystallization generally is not necessary. The corresponding saturated tetrachloroalkyl alcohols are by-products of the reaction.

The present process provides a technically more simple way to make the heretofore difficulty accessible dichloroalkenols.

The products of the present invention are useful for the synthesis of other compounds and as flame proofing agents for synthetic plastics. The corresponding diols can be used, e.g., for the production of polyesters. The products are useful also as protective agents for plants.

EXAMPLE 1

224 parts by weight of propargyl alcohol (B.P. 114–115° C.) was introduced into a chlorinating apparatus equipped with a stirrer, cooling means and inlet and outlet connections and cooled therein to —45° C. While maintaining this temperature and at a pressure of 900 torr the alcohol was saturated with hydrogen chloride by gradually introducing 220 parts by weight of dry hydrogen chloride. Then while maintaining said temperature and pressure a total of 284 parts by weight of gaseous chlorine was introduced over a period of 90 minutes with stirring. During the chlorination a part of the hydrogen chloride was expelled from the solution. After the end of the chlorine introduction the product was largely freed of hydrogen chloride and excess chlorine at about 0° C. under a weak vacuum and finally the product was fractionally distilled under reduced pressure in a 0.2 meter packed column. 46 parts by weight of propargyl alcohol (20.5% of the amount introduced) was recovered at 20 mm. Hg/cm.$^2$ pressure in the temperature range 32–38° C. After a small forerun 245 parts by weight of 2,3-dichloropropene-(2)-ol-(1) (60.8% of theory based upon the amount of the propargyl alcohol reacted) having a chlorine content of 56.1% (calc.=55.9%) and a refractive index $n_D^{20}$ of 1.5030 was distilled at 20 mm. Hg/cm.$^2$ pressure within the range 80 to 87° C. At 2 mm. Hg/cm.$^2$ pressure and within the temperature range 75–95° C., 132 parts by weight of crude 2,2,3,3-tetrachloropropanol-(1) (21.0% of the theoretical yield based upon reacted propargyl alcohol) having a chlorine content of 68.5% (theory=71.7%) distilled. By fractionation of the dichloropropanol mixture relatively pure cis-2,3-dichloropropanol-(2)-ol-(1) having a boiling point of 86–87° C. at 20 mm. Hg/cm.$^2$ pressure can be recovered. When the chlorination was carried out at —35° C. in the presence of only 160 parts by weight of hydrogen chloride the yield of dichloropropanol was only 53.3% of the theoretical yield.

EXAMPLE 2

800 parts by weight of dry hydrogen chloride was gradually introduced into a solution of 86 parts by weight of 2-butyndiol-(1,4) in 500 parts by weight of tetrahydrofuran at from —40 to —55° C. and then 90 parts of chlorine was introduced with stirring over a period of 100 minutes at the same temperature. The hydrogen chloride, the solvent and the unreacted chlorine were separated as described in Example 1 and the remainder was distilled under vacuum in a short column filled with Raschig rings. After a small forerunning a total of 122 parts by weight of 2,3-dichlorobutene-(2)-diol-(1,4) (77.7% of the theoretical yield based upon the amount of butyne diol introduced) having a chlorine content of 45.2% (calculated=45.3%) and an OH number of 720 (theoretical=713) distilled within the range from 136 to 148° C. at a pressure of 2 mm. Hg/cm.$^2$. The product froze at once to a solid mass. By continuing the distillation 24 parts by weight of crude tetrachlorobutane diol (about 10% of theory) distilled at 175–185° C. and 2 mm. Hg/cm.$^2$.

When the chlorination was carried out at −35° C. in the presence of about 450 parts of hydrogenchloride the yield of dichlorobutene diol was lowered to 66.2% of the theoretical yield.

I claim:
1. Process for the production of a dichloroalkenol which comprises reacting an alkynol selected from the group consisting of propargyl alcohol, butyne-(2)-diol-(1,4)-butyne-(2)-ol-(1), hexyne-(3)-diol-(2,5) and 2,7-dimethyloctyne-(4)-diol-(3,6) with less than 2 moles of gaseous chlorine per mole of said alkynol at a temperature below −10° C. at which the added chlorine is still noticeably reacted and in substantial absence of water and in the presence of dissolved hydrogen chloride.
2. Process as defined in claim 1 in which the chlorine is contacted with the alkynol in the presence of an inert diluent of the group consisting of tetrahydrofuran and dioxan which increases the dissolving capacity of the reaction mixture for the hydrogen chloride.
3. Process as defined in claim 2 in which the chlorine is contacted with the alkynol under a superatmospheric pressure within the range 0.1–5 atmospheres.
4. Process as defined in claim 1 in which the alkynol is propargyl alcohol and 2,3-dichloropropene-(2)-ol-(1) constitutes the major part of the chlorinated product.
5. Process as defined in claim 1 in which the alkynol is butyne-(2)-diol-(1,4) and 2,3-dichlorobutene-(2)-diol-(1,4) constitutes the major part of the chlorinated product.

References Cited

UNITED STATES PATENTS

| 3,037,059 | 5/1962 | Kaiser | 260—633 |
| 3,290,395 | 12/1966 | Bohm et al. | 260—633 |

FOREIGN PATENTS

| 1,034,116 | 12/1958 | Germany. |
| 1,119,850 | 6/1962 | Germany. |

BERNARD HELFIN, *Acting Primary Examiner.*

LEON ZITVER, *Examiner.*

N. J. KING, H. T. MARS, *Assistant Examiners.*